Aug. 13, 1957 W. F. JETTER 2,802,646
FLUID REACTANT ROTOR IN REGENERATIVE HEAT EXCHANGE APPARATUS
Filed May 14, 1954 2 Sheets-Sheet 1

INVENTOR
WILLIAM F. JETTER
BY
ATTORNEY

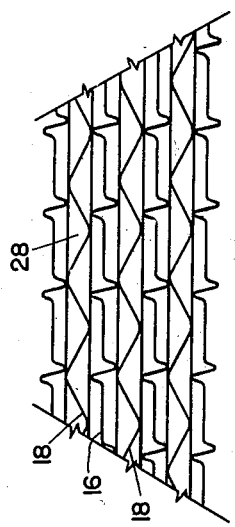
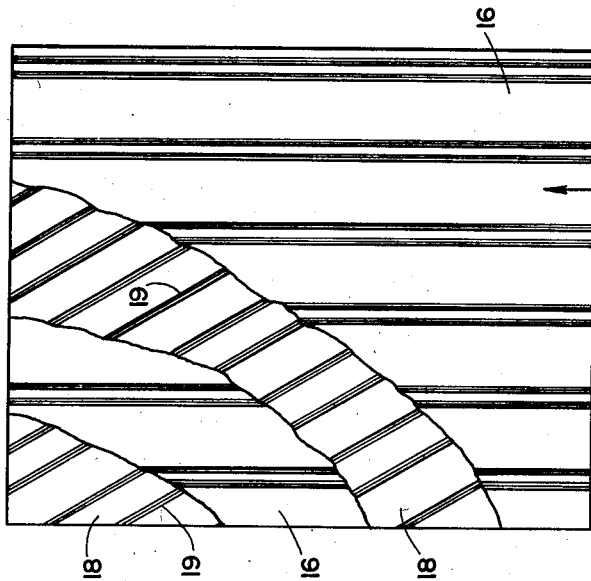
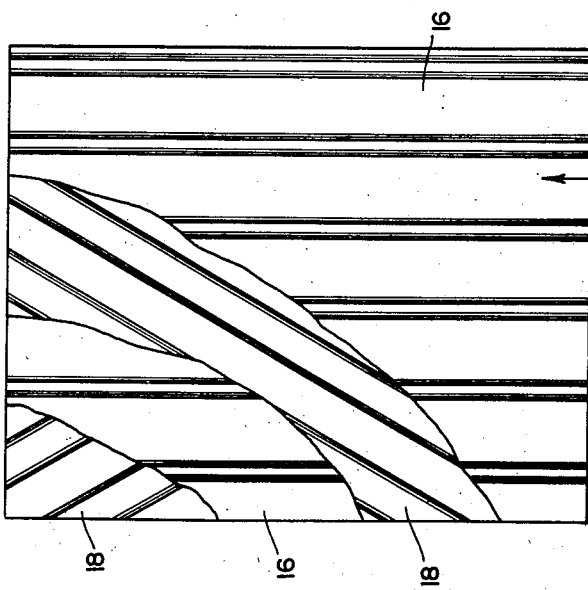
INVENTOR
WILLIAM F. JETTER

United States Patent Office 2,802,646
Patented Aug. 13, 1957

2,802,646

FLUID REACTANT ROTOR IN REGENERATIVE HEAT EXCHANGE APPARATUS

William Francis Jetter, Bronxville, N. Y., assignor to The Air Preheater Corporation, New York, N. Y., a corporation of New York Application May 14, 1954, Serial No. 429,952

3 Claims. (Cl. 257—6)

The present invention relates in general to a rotary regenerative air preheater and in particular it relates to a novel arrangement of corrugated heat transfer elements in a preheater rotor arranged to utilize normal fluid flow to provide the motive power necessary to turn the rotor about its axis in order to eliminate the need for external motive power.

A conventional rotary regenerative air preheater includes a housing enclosing a rotor carrying heat absorbing material in the form of metallic plates that are first positioned into the hot gas stream of a gas passageway to absorb heat therefrom and then moved into an air passageway to impart heat to air flowing therethrough. Frequently air preheaters of this general type are provided with a central driving means utilizing a motor and reduction gear connected directly to a centrally mounted rotor post, while other rotors are provided with a driving rack extending circumferentially of the rotor in cooperative engagement with suitable driving means which supplies the necessary rotative force thereto.

Since a rotary regenerative air preheater normally has available large quantities of gases and air flowing over spaced heat exchanger plates, I propose to utilize the energy inherently included in the flowing gases to move the rotor about its axis and thereby dispense with or supplement usual rotor driving means.

A primary object of this invention therefore is to provide an arrangement of heat transfer elements which utilizes the impulse and lift forces of the fluid streams moving over the heat transfer elements of a rotary regenerative air preheater to provide the motive power necessary to turn the rotor about its axis of rotation.

In the drawings:

Figure 3 is a top plan view of a fragmentary portion of basketed heat exchange elements indicating the undulated heat transfer element arranged in alternation with a combination of plane and vertical ribbed sheets.

Figure 4 illustrates in elevation and arrangement of corrugated heat transfer elements having the corrugations thereof extending obliquely in the same diretcion.

Figure 5 illustrate in elevation an arrangement of corrugated heat transfer elements having the corrugations thereof obliquely inclined in opposite directions.

Figure 1:
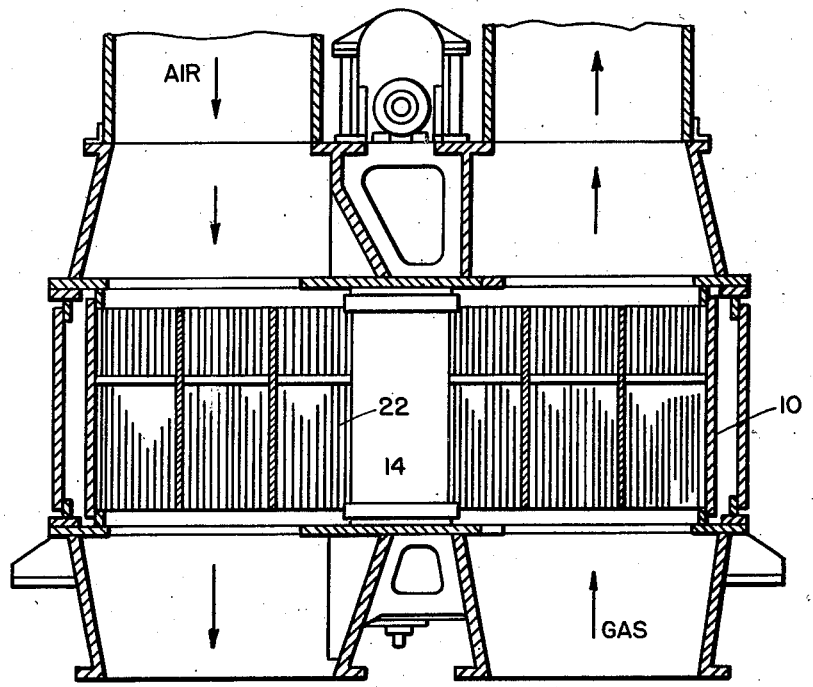
Figure 1 is a diagrammatic elevational view of a rotary air preheater embodying the invention.

In the drawings, the numeral 10 designates the cylindrical shell of a rotor for a rotary regenerative air preheater which is divided into sector shaped compartments 11 by radial partitions 12 connecting the rotor shell 10 with the rotor post 14. The sector shaped compartments are further divided by stay plates 2 into baskets 24, 25 and 26 containing heat transfer material in the form of metallic sheets which are spaced apart to form a series of flow passages parallel to the rotor axis. On rotating about the rotor axis, the plates first absorb heat from the hot gases flowing through the gas passageway and then as the rotor continues to turn about its axis the plates are moved into a stream of air flowing through the air passageway to impart heat thereto.

As seen in Figures 2 to 5, the heat absorbing surface is composed of a series of substantially flat plates 16 each formed with a plurality of widely spaced Z-shaped ridges extending parallel to the rotor axis and serving as spacers for other plates 18 which have a continuous series of uniform corrugations or undulations 19 extending obliquely from one end of the sheet to the other. As may be seen in Figure 2 of the drawing, the packed plates are arranged within their respective baskets according to a predetermined plan whereby certain of the basketed plates 20 are arranged substantially parallel to the radially disposed diaphragms while other basketed elements 22 are arranged substantially normal thereto.

Figure 3 illustrates a general arrangement of heating element which indicates the manner in which adjacent plates 16 and 18 abut to form passages 28 for the flow of fluid therebetween. The ribbed sheets serve as spacers between plates 18 whose corrugations may be arranged to extend similarly in a single direction as illustrated in Figure 4 or the corrugation may be crossed to extend in obliquely opposite directions in the manner illustrated by Figure 5.

In operation the fluid stream flowing over the mass of corrugated sheets arranged according to this invention induces certain forces which turn the rotor about its axis. These forces are a combination of the forces set up by the impact of the fluid against the undulations and the lift effect produced by the fluid streams flowing across the undulations. The impact or impulse force is the force exerted on the projected area of the undulated surface where the fluid entering the rotor impinges, and is then turned through an angle deviating from its original direction. This force has a tangential component which tends to turn the rotor about its centrally positioned rotor post. The lift force acts normal to the undulated surface and has a component in the plane of the undulated surface, acting at right angles to the direction of the undulations. This component may be further broken down into two components one being exerted in the direction of fluid flow and one at right angles thereto. This latter force combines with the impact force to produce a torque effect upon the rotor sufficient to rotate it upon its bearing supported rotor post.

When all of the corrugated plates are arranged so the obliquely extending corrugations lie similarly as seen in Figure 4, the sum of all impact forces plus the sum of all lift forces acting upon the corrugated plates is made available to drive the rotor about its axis. If however, a portion of the corrugated plates are arranged so the oblique corrugations extend in opposite directions, there is produced a neutral zone which provides no rotative force to the rotor.

In the application of this invention to an air preheater rotor, the rate of rotation for any individual installation may be varied from a minimum to a maximum by merely varying the arrangement of the obliquely inclined corrugated heat transfer elements.

Figure 2:
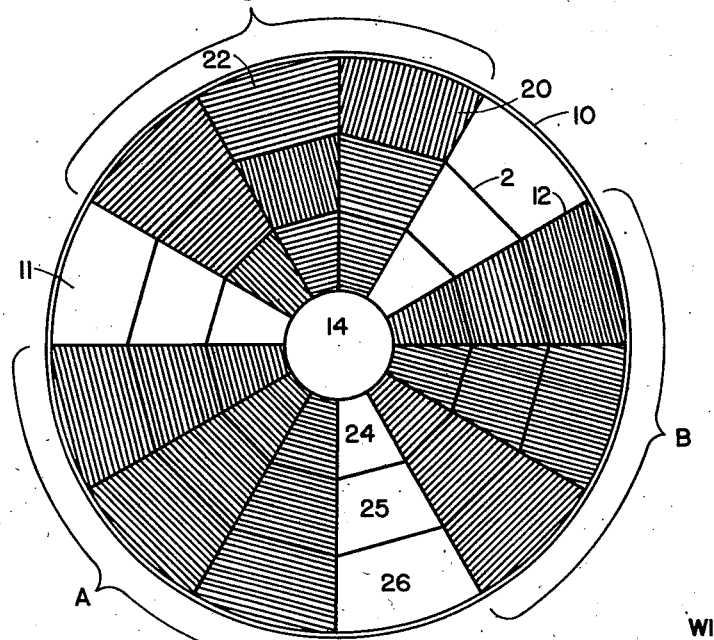
Figure 2 is a top plan view of an air preheater rotor diagrammatically illustrating three basic arrangements of heat exchanger elements according to this invention.

Figure 2 diagrammatically represents several arrangements of basketed elements within the individual sectors of a preheater rotor. Section A depicts three sectors of a rotor having their basketed elements lying substantially concentric with the rotor shell. This arrangement of heat transfer elements will provide a maximum torque to the air preheater rotor and such an arrangement is used to provide maximum speed of rotation.

This basic, and perhaps preferred, arrangement may however be varied to provide different degrees of turning force to the rotor. Reference "B" illustrates three abutting sectors of a rotor, the central sector of which contains packed heat transfer element extending substantially radially of the rotor. Such a sector of radially extending plates would be neutral so far as supplying any turning force to the rotor, since the impulse and lift forces are both directed radially rather than in a direction tangential to the axis of the rotation. Individual baskets of elements may be further modified by varying the element arrangement as shown in section "C." Here the basketed elements within an individual sector are arranged to supply varying amounts of turning force to the rotor. By such an arrangement, the degree of turning force provided by the undulated plates is governed by the distance the radially lying plates are spaced from the center of the rotor, since the farther from the center, the larger the surface area. By such an arrangement it can be seen that a basket of heat transfer elements with radially lying plates positioned near the periphery of the rotor would neutralize a relatively large surface area and thereby appreciably affect the rotor turning force.

Individual baskets of elements may be still further modified by varying the element arrangement as shown in Figures 4 and 5. Figure 4 shows spaced corrugated sheets having the rows of continuous corrugations lying parallel and in the same direction, while Figure 5 illustrates a plate arrangement wherein spaced plates are reversed so the net turning force is reduced until the desired turning force is attained.

The foregoing plate arrangements are given by way of illustration only and are not to be construed as limitations of the possible arrangements for elements or baskets of elements carried by the rotor of a rotary regenerative air preheater. By using the disclosed arrangements or any variation thereof, any suitable rotative force may be made available from the action of the fluid flow over the corrugated plates.

What I claim is:

1. A rotary regenerative air preheater having a cylindrical housing including parallel passages for hot gases and air; a cylindrical rotor concentrically aligned within the housing and adapted to rotate about a centrally disposed rotor post; radial partitions extending from the rotor post to the circumferential periphery of the rotor dividing the rotor into a plurality of abutting sector shaped compartments; bundles of heat exchange element carried by the abutting compartments, said heat exchange element comprising a plurality of corrugated metallic sheets alternately arranged between plane sheets formed with axial ridges separating the corrugated sheets to form fluid passageways therebetween, the corrugations of plates lying in alternate sector shaped compartments similarly inclined obliquely in a radial direction and the corrugations of plates carried by intervening compartments inclined obliquely in a direction normal thereto to provide a surface over which the gas flows to produce a combination of forces which rotates the rotor about its axis.

2. A rotary regenerative air preheater having a cylindrical housing including parallel passages for hot gases and air; a cylindrical rotor concentrically aligned within the housing and adapted to rotate about a centrally disposed rotor post; radial partitions extending from the rotor post to the periphery of the rotor dividing the rotor into a plurality of abutting sector shaped compartments; baskets of heat transfer elements carried in the compartments comprising a series of corrugated sheets alternately arranged between sheets with parallel spacing ribs providing a plurality of channels for the flow of fluids between said corrugated sheets, the corrugations of alternate baskets of elements similarly extending obliquely in a circumferential direction and the corrugations of intermediate baskets inclined obliquely in a radial direction to neutralize a portion of the rotative force effected by the fluid stream moving over the circumferentially extending corrugated sheets.

3. A rotary regenerative air preheater having a cylindrical housing including parallel passages for hot gases and air; a cylindrical rotor concentrically aligned within the housing and adapted to rotate about a centrally disposed rotor post; radial partitions extending from the rotor post to the periphery of the rotor dividing the rotor into a plurality of abutting sector shaped compartments; baskets of heat exchange elements carried by each compartment comprising a series of corrugated sheets alternately arranged between plane sheets with parallel spacing ribs which provide a series of flow channels therebetween, the corrugations of sheets carried by alternate sectors extending obliquely and similarly in a circumferential direction to provide a surface over which the fluid stream flows to effect a rotational force upon the rotor, and adjacent corrugated sheets lying in intermediate sectors extending obliquely in opposite directions to provide a mass of heating element which provides no additional rotative force to the preheater rotor.

References Cited in the file of this patent

UNITED STATES PATENTS

| | | |
|---|---|---|
| 2,023,965 | Lysholm | Dec. 10, 1935 |
| 2,432,198 | Karlsson et al. | Dec. 9, 1947 |
| 2,596,642 | Boestad | May 13, 1952 |

FOREIGN PATENTS

| | | |
|---|---|---|
| 291,402 | Great Britain | Dec. 13, 1928 |
| 363,357 | Great Britain | Dec. 10, 1931 |